United States Patent
Ghoshal

(10) Patent No.: US 7,285,579 B2
(45) Date of Patent: *Oct. 23, 2007

(54) SOLVENTLESS, NON-POLLUTING RADIATION CURABLE COATINGS

(75) Inventor: Ramkrishna Ghoshal, Clifton Park, NY (US)

(73) Assignee: Polyset Company, Inc., Mechanicville, NY (US)

( * ) Notice: Subject to any disclaimer, the term of this patent is extended or adjusted under 35 U.S.C. 154(b) by 294 days.

This patent is subject to a terminal disclaimer.

(21) Appl. No.: 11/079,971

(22) Filed: Mar. 15, 2005

(65) Prior Publication Data

US 2005/0170187 A1    Aug. 4, 2005

Related U.S. Application Data

(63) Continuation-in-part of application No. 10/636,101, filed on Aug. 7, 2003, now Pat. No. 6,962,948.

(51) Int. Cl.
*C08F 2/46* (2006.01)

(52) U.S. Cl. .............. 522/31; 522/148; 427/387; 427/515; 427/503; 528/27; 523/425

(58) Field of Classification Search .............. 522/31, 522/148; 427/387, 515, 503; 528/27; 523/425; 428/447

See application file for complete search history.

(56) References Cited

U.S. PATENT DOCUMENTS

| | | | |
|---|---|---|---|
| 5,073,643 A | 12/1991 | Crivello | 556/64 |
| 5,260,349 A | 11/1993 | Crivello | 522/31 |
| 5,650,474 A | 7/1997 | Yamaya et al. | 528/12 |
| 5,757,313 A | 5/1998 | Meneghini et al. | 347/262 |
| 5,863,970 A | 1/1999 | Ghoshal et al. | 523/434 |
| 6,069,259 A | 5/2000 | Crivello | 549/214 |
| 6,602,602 B1 | 8/2003 | Crivello | 428/402 |
| 6,632,960 B2 | 10/2003 | Crivello et al. | 562/30 |
| 6,962,948 B2 * | 11/2005 | Ghoshal | 522/31 |
| 7,019,386 B2 * | 3/2006 | Ghoshal et al. | 257/642 |
| 2002/0193619 A1 | 12/2002 | Crivello et al. | 556/1 |

FOREIGN PATENT DOCUMENTS

WO    WO98/33645    8/1998

OTHER PUBLICATIONS

Crivello, J. V. et al.; "The UV Cure of Epoxy-Silicone Monomers", *Polymeric Materials Science and Engineering*, 60, 217-227 (1989).
Crivello, J.V., et al., "The Synthesis, Characterization, and Photoinitiated Cationic Polymerization of Silicon-Containing Epoxy Resins", *J. Polym. Sci. Part A: Polym. Chem. Ed*, 28(3), 479-503 (1990).

* cited by examiner

Primary Examiner—Margaret G. Moore
(74) *Attorney, Agent, or Firm*—Heslin Rothenberg Farley & Mesiti P.C.

(57) ABSTRACT

Solventless siloxane epoxy-based coating compositions for use on metals, plastics, wood, and glass are disclosed. The compositions are cationically curable in air by U.V. or by electron beam radiation. The siloxane epoxy coating compositions exhibit excellent film properties after curing, such as good adhesion, flexibility, and appearance. The coating compositions may be clear or may contain fillers, dyes, and pigments. A method for manufacturing a coated metal, plastic, wood, or glass substrate using the compositions is also disclosed, as well as the coated material manufactured by the method.

28 Claims, No Drawings

SOLVENTLESS, NON-POLLUTING RADIATION CURABLE COATINGS

CROSS-REFERENCE TO RELATED APPLICATION

This application is a continuation-in-part of U.S. patent application Ser. No. 10/636,101 filed Aug. 7, 2003, now U.S. Pat. No. 6,962,948 the entire disclosure of which is incorporated herein by reference.

FIELD OF THE INVENTION

The present invention relates to solventless siloxane epoxy compositions, and more particularly to solventless siloxane epoxy compositions that are curable by U.V. or electron beam radiation.

BACKGROUND OF THE INVENTION

High performance metal, plastic, wood, and glass coatings are used in both indoor and outdoor applications, such as in building products, appliances, transports, inkjet recording, etc. Due to increasingly more stringent emission rules and increasing energy costs associated with coating conversion and pollution controls, it is preferable that such coatings contain 100% solids and no volatile organic compounds (zero VOC's). Unfortunately, however, most of the non-polluting zero VOC coating systems currently being used do not have good outdoor resistance (weathering and corrosion properties).

Problems associated with the use of solids systems on a commercial scale include mediocre coating performance, slow line speed, difficulty in adopting the systems, and/or high initial capital cost. Furthermore, the coatings may not be fully non-polluting and may contain unacceptable VOC levels. For these reasons, solid systems have been unsuccessful in replacing solvent-borne or water-solvent borne systems in the high volume coil-coating industry.

Most thermal curing coating chemistries are based on solution, emulsion, or dispersion of solid resins or very high viscosity resins (high molecular weight thermoplastic or thermostat resins), which involve very little or no curing (solidification). Conversion to the solid state, which provides tack-free, dry coatings can be completed quickly by simply evaporating the solvent from the solid resin solution. Thus, the present state-of-the-art thermal systems employ this technique. However, one disadvantage associated with this type of solid/high viscosity resin is that the use of solvents or co-solvents is required, and thus, the materials contain VOC's. In addition, as is commonly known, low molecular weight, low viscosity monomers can also evaporate from the line, especially when heated at high temperatures and when present in thin films. Thus, even if the coatings meet the requirements under the present VOC definition, the coating line will still generate organic vapor emission of a different kind, i.e. from the monomers.

Current ultraviolet (U.V.) curable coatings, which are 100% solids, zero VOC, are disadvantageous because they can be used only for non-pigmented coatings or thin film pigmented applications. In addition, the performance of such U.V. curable coatings is in general inferior to that of thermally cured coatings in the areas of adhesion, U.V. stability, corrosion resistance, and weatherability, which are very important properties for use in building products and in automotive applications.

Electron beam (E-beam or E.B.) curable coatings, which contain 100% solids and zero VOC, can be used for pigmented coatings, but current E-beam coatings suffer from the same performance limitations as do U.V. curable coatings, when compared with thermal systems. This is largely because the same resin and curing chemistries (acrylates) are employed in existing E-beam curable coatings as in the U.V. materials. Additional costs incurred with radiation (both U.V. & E-beam) curable acrylate coatings include those associated with the use of nitrogen blanketing.

Alternate available cationic curing (U.V. & E.B.) epoxy chemistry coating compositions do not require nitrogen blanketing, but the cure rates of currently available epoxies are very slow when compared with acrylates. In addition, a soft, tacky surface is left outside the area irradiated by the beam, which is unacceptable in a high speed, low dose line. Furthermore, various processing and performance limitations have made them undesirable for use in Original Equipment Manufacture (OEM) markets, such as in appliances, building products, and automotives, etc. Thus, until now, radiation curable (U.V. & E.B.) coatings have not been a good alternate technology for providing zero VOC, pollution-free coatings for coil coatings and printing inks. Furthermore, current filled and pigmented coatings typically include the use of an environmentally unfavorable chromate filler in order to pass corrosion testing.

Therefore, a need exists for a cationic curable epoxy resin coating chemistry, which meets the process and performance parameters of coil coatings in OEM markets and also the meets the requirements for printing inks and inkjet recordings. Preferably, the viscosities of the monomers and oligomers should be low enough to formulate a highly filled and/or pigmented or dye-containing coating without the use of any solvents, and the coating should also be able to meet the application viscosity (less than 3000 cps) of a high speed reverse roll coating system, i.e. greater than 400 FPM.

In addition, it is desirable that certain economic and performance parameters be met. Thus, the resin chemistry of such coil coatings and printing inks should be fully compatible with commonly used pigments, dyes, and fillers, as well as with commonly used additives, thereby providing formulations with minimum restrictions. It would also be environmentally advantageous if chromate-containing pigments could be eliminated as an ingredient.

Furthermore, to be useful in coating metal, plastic, wood, and glass substrates, the coatings should meet industry standards for each of the application areas in terms of adhesion, flexibility, gloss, weathering, corrosion, etc. Also, the coating chemistry should be suitable for high speed, low dose E-beam and U.V. cure lines, such that the materials can be immediately used or rolled into coils without any coating lift up problem, with or without nitrogen blanketing.

SUMMARY OF THE INVENTION

The present invention meets the aforementioned needs and avoids the problems associated with available metal, plastic, wood, or glass coatings. The invention is predicated on the unexpected discovery of a new cationically curable resin chemistry based on novel siloxane epoxy resins. These novel resins can be cured by U.V. or E-beam radiation and can be cured in air without the need for nitrogen blanketing. This is advantageous because the cost of maintaining an inert atmosphere can contribute substantially to the overall cost of curing by radiation. For use in coil coating applications, the compositions can be immediately rolled into coils without any coating lift up problem.

The coatings of the present invention are solventless and therefore, contain zero VOC's, making them desirable for use in industry because they do not present any health hazards before polymeric conversion. In addition, the unique resins of the present invention are surprisingly superior to currently available coatings because they contain 100% solids, can be cured by high speed, low dose, E-beam or U.V. radiation and can be used as metal, plastic, wood, or glass coatings for both indoor and outdoor applications and for inkjet media. Other advantages of the present compositions over currently available resins include excellent and improved cured film properties, such as exhibiting good adhesion, flexibility (tough without being brittle), weatherability, and unexpectedly good corrosion resistance even in the absence of a chromium-containing filler.

The coating compositions may be clear or may contain fillers, dyes, pigments, and/or other additives. Accordingly, in one aspect, the present invention is a clear coating composition comprising from about 90 to about 100 parts by weight of a base resin; from 0 to about 3 parts by weight of an adhesion promoter and from about 2 to about 10 parts by weight of a cationic polymerization initiator, based on the total weight of the composition. The base resin comprises:

(A) from about 30 to about 55 parts by weight of a cycloaliphatic epoxy functional siloxane monomer having structure (IA)

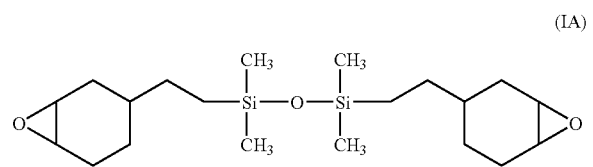

(B) from about 5 to about 30 parts by weight of a cycloaliphatic epoxy functional siloxane oligomer having structure (IB)

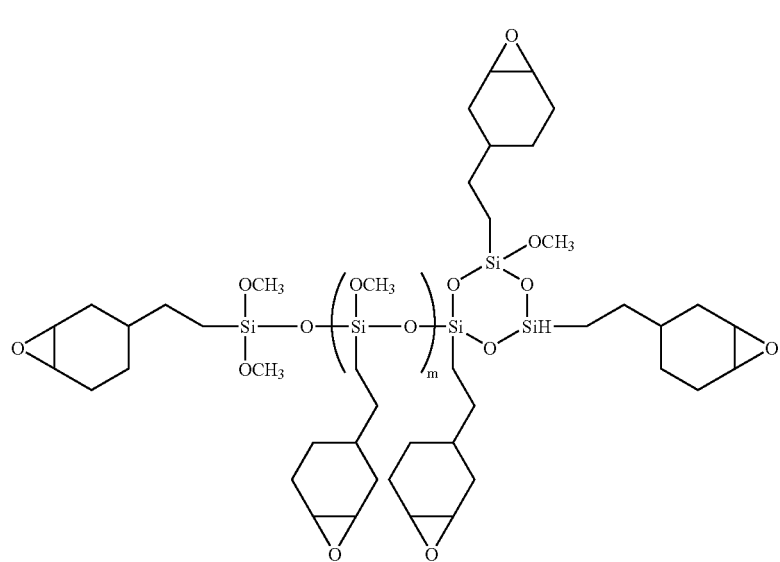

wherein m is an integer having a value from 5 to 50;
(C) from about 20 to about 55 parts by weight of at least one non-silicon-containing epoxy resin selected from the group consisting of (i) epoxidized vegetable oils, (ii) epoxidized vegetable oil esters, and (iii) 3,4-epoxycyclohexylmethyl-3',4'-epoxycyclohexane carboxylate having structure (IIA)

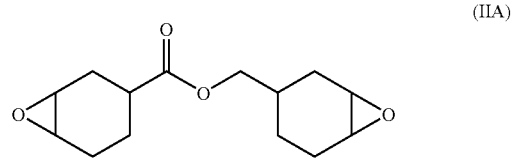

(D) from 0 to about 60 parts by weight of one or more flexibilizers. The cationic polymerization initiator is selected from the group consisting of (i) at least one sulfonium salt catalyst in solution with a first carrier medium; (ii) a diaryliodonium salt catalyst in solution with a second carrier medium; and (iii) mixtures of (i) and (ii).

In another aspect, the present invention is a filled coating composition comprising from about 15 to about 90 parts by weight of the aforementioned base resin; from about 10 to about 85 parts by weight of one or more components selected from the group consisting of fillers, dyes, pigments, and additives; from 0 to about 1 part by weight of an adhesion promoter and from about 1 to about 10 parts by weight of a cationic polymerization initiator, as previously described. Formulations containing fillers, dyes and/or pigments, as well as any of the other aforementioned components, are useful on metal as primers or topcoats and on plastic as printing inks, for example.

In another aspect, the invention is a method for manufacturing a coated article. The first step of the method involves applying either the aforementioned clear coating composition or the coating composition containing fillers, dyes or pigments, and/or additives diluents to an article made of wood, glass, plastic, or metal. In the second step, the composition deposited on the article is exposed to E-beam or U.V. radiation. Optionally, after polymerization, the coated article may be heated to a temperature ranging from about 80° C. to about 125° C.

In yet another aspect, the invention is a coated article manufactured by the previously described method.

DESCRIPTION OF THE PREFERRED EMBODIMENTS

The present siloxane epoxy coating compositions, whether filled or clear, include a base resin, an optional adhesion promoter and a cationic polymerization initiator. The filled coatings also include fillers, pigments, and/or dyes, and may contain other additives, such as anti-setting agents, anti-foaming agents, flow-control agents, wetting agents, etc. These epoxy resins coatings can be cured by E-beam or U.V. radiation (also referred to herein as "actinic radiation") to give the desired processing parameters and excellent cured film properties described herein in terms of adhesion, flexibility, weatherability, corrosion resistance, etc. However, the mere combination of these ingredients or similar ingredients followed by exposure to actinic radiation does not guarantee a cured coating having excellent cured film properties. Instead, it is the amount of each specific component taken together as a whole that provides the unexpectedly superior cured coatings of the present invention.

The base resin includes a cycloaliphatic epoxy functional siloxane monomer having structure (IA), a cycloaliphatic epoxy functional siloxane oligomer having structure (IB), one or more non-silicon containing epoxy resins, and optional flexibilizers. The clear, unfilled coating compositions contain from about 90 to about 100 parts by weight of the base resin based on the total weight of the formulation, and the filled coating compositions (i.e., containing fillers, pigments, dyes, etc.) contain from about 15 to about 90 parts by weight of the base resin relative to the total weight of the formulation.

Cycloaliphatic epoxy functional siloxane monomer having structure (IA) has the chemical name 1,1,3,3-tetramethyl-1,3-bis[2-(7-oxabicyclo[4.1.0]hept-3-yl)ethyl]disiloxane and has a molecular weight of 376 g/mole. Siloxane (IA) is commercially available from Polyset Company Inc., Mechanicville, N.Y. as PC1000. Siloxane oligomer (IB), wherein m is an integer from 5 to 50, has a molecular weight ranging from about 1000 to about 10,000 g/mole and is commercially available from Polyset in its PC2000 series, e.g., PC2000, PC2003, PC2000HV. In both the clear and filled/pigmented or dye-containing coating formulations, cycloaliphatic epoxy functional siloxane (IA) is incorporated into the base resin in amounts ranging from about 30 to about 55 parts by weight of the total base resin, and siloxane (IB), in amounts ranging from about 5 to about 30 parts by weight.

Also included in the base resin of the present coating formulations are from about 20 to about 55 parts by weight of one or more non-silicon-containing epoxy resins. Suitable non-silicon-containing epoxy resins include epoxidized vegetable oils and epoxidized vegetable oil esters, such as VIKOFLEX® 9010, which is a methyl epoxy linseedate available from Atofina Chemicals. Inc. Another suitable non-silicon containing epoxy resin is a cycloaliphatic epoxy, such as 3,4-epoxycyclohexylmethyl-3',4'-epoxycyclohexane carboxylate (EECH), also known as 7-oxabicyclo[4.1.0]hept-3-ylmethyl 7-oxabicyclo[4.1.0]heptane-3-carboxylate). EECH has structure (IIA) and is commercially available from Union Carbide as ERL 4221.

Optionally, the base resin may include up to about 60 parts by weight of one or more flexibilizers, which provide flexibility to the compositions. Suitable flexibilizers include epoxides based on a diglycidyl ether of bisphenol A, which are represented by structure (IIB):

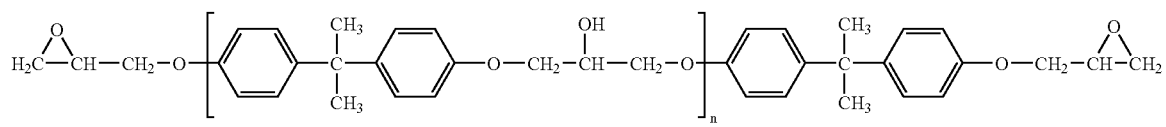

(IIB)

The average value of n in structure (IIB) is 0 or about 0.07, 0.14, 2.3 or 4.8. Examples include ARALDITE® 6084 and ARALDITE® 6097, which are available from Ciba Geigy in solid form. VIKOLOX® 14, which is a C-14 epoxidized alpha olefin available from Elf Atochem, is another suitable flexibilizer. Polyol flexibilizers, such as caprolactan triol available from Solvay Interox, Inc. as CAPA® 4101 (previously sold as CAPA® 316) are also suitable. CAPA® 4101 has the chemical name 2-oxepanone and is a polymer of 2-2-bis(hydroxymethyl)-1, 3-propanediol having the chemical formula ($C_6H_{10}O_2$ $C_5H_{12}O_4$). Additional useful flexibilizers include thermoplastic acrylic resins, such as DEGALAN® 64/12 and DEGALAN® P24, which are available from Rohm; limonene oxides, such as limonene dioxide available from Elf Atochem; elastomers; and phenoxy resins. Multifunctional hydroxyl-terminated epoxidized polybutadiene resins, such as Poly bd® 600E and 605E available from Sartomer are also suitable. Allyl ethers including, but not limited to, propenyl ethers available from International Specialty Products (ISP), BASF, etc., are also useful flexibilizers. In addition, vinyl ethers, such as Rapi-Cure CHVE (cyclohexane dimethanolvinylether), DDVE (n-dodecylvinylether), HBVE (4-hydroxybutylvinylether) and DVE-3 (triethyleneglycol divinylether) available from ISP may be used. Other suitable flexibilizers include carboxyl-terminated polybutadiene or carboxyl-terminated polybutadiene acrylonitrile of molecular weight 3000-5000 available as HYCAR™ CTB-2000×162 and CTBN 1300× 31, respectively, from Noveon; and phenolic antioxidants, such as Ciba-Geigy's Irganox™ 1035 (thiodiethylene bis (3,5-di-tert-butyl-4-hydroxyhydrocinnamate). Oxetane monomers available from Toagosei Co. Ltd., Japan, such as OXT 121 (XDO), which is 1,4-bis[(3-ethyl-3-oxetanylmethoxy)methyl]benzene and OXT 221 (DOX), which is bis{[1-ethyl (3-oxetanil)] methyl}ether are also useful flexibilizers. Other suitable flexibilizers would be obvious to those of skill, and the invention is not limited to the flexibilizers described herein.

In addition to the base resin, the present compositions may optionally include an adhesion promoter. In clear formulations, up to about 3 parts by weight of the adhesion promoter may be added for improved adhesion to metal. However, in filled compositions, up to about 1 part by weight is sufficient to provide good adhesion to the cured films. Exemplary adhesion promoters include, but are not limited to, epoxy alkoxysilanes, such as 2-(3,4-epoxycyclohexyl)-ethyl trimethoxysilane and 3-glycidyloxypropyltrimethoxysilane, both of which are available from Witco Corporation as A186 and A187, respectively.

The filled coating formulations also contain from about 10 to about 85 parts by weight fillers, dyes, pigments, and/or other additives, such as anti-setting agents, flow control agents, antifoaming agents, wetting agents, etc. Examples of such ingredients include, but are not limited to, dyes, such as phthalo blue, carbon black, and the like; titanium dioxide pigments, such as $TiO_2$ 2160, $TiO_2$ 2310, $TiO_2$ 2020, and the like available from Kronos, Inc.; talc (magnesium silicate hydroxide), such as Nytal 300, which is available from R.T.Vanderbilt; ceramic microspheres, such as Zeospheres™ microspheres, available from 3M as G-400 and G-200; antifoaming agents (foam suppressants), such as BYK® 501 available from BYK Chemie USA, Inc.; wetting agents, such as Silwet® L-7604 available from OSI Specialities; grinding agents, such as BYK® 307, available from BYK Chemie USA, Inc.; hydrophobic fumed silica, such as Aerosil® R972, available from Degussa-Hüls; barytes ($BaSO_4$) including synthetic barytes, such as Cimbar™ EX and natural barytes, such as Mineral and Pigment Solutions' (MPSI) 4721 (particle size 1 µ). In addition, inorganic particulate or flake fillers may be included. For example, conductive metallic fillers, such as copper or silver particles and silver flakes, such as AAR-0595 from Chemet, may be included in the formulations for use as conductive inks. Silver or silver-coated copper nanopowder of appropriate particle sizes (<100 nm), such as that available from Sigma-Aldrich, may also be used. Nonconductive inorganic metallic fillers, such zinc may also be included. Substitution with other similar fillers, pigments, dyes, and other additives will be obvious to those of skill in the coating arts.

One unexpected and surprising advantage of the present filled compositions over currently available primer and topcoat resins is that excellent corrosion resistance is exhibited even in the absence of a chromate or phosphate additive. By contrast, current commercial coatings must include such anticorrosion ingredients, such as zinc chromate, strontium chromate, zinc phosphate, or strontium phosphate to pass corrosion testing. Because the use of these materials is an important environmental concern, elimination thereof in the compositions described herein makes the present coatings far more desirable than any coatings previously available.

Other surprising and unexpected features of the filled formulations described herein for use on metal substrates are that: 1) a pretreatment of the metal substrate (chemical conversion coating to improve adhesion and corrosion resistance) prior to applying the primer may be eliminated in certain applications; and 2) a pigmented topcoat may be applied directly to the substrate without applying a primer coat. Thus, use of the present formulations is more economical and simpler than those currently available because two steps may be eliminated, if desired. Furthermore, as previously mentioned, the primers and topcoats are environmentally friendly without the inclusion of chromates or phosphates.

A cationic polymerization initiator is also included in the present coatings to facilitate U.V. and E-beam curing. The clear formulations contain from about 2 to about 10 parts by weight of the cationic polymerization initiator solution based on the total weight of the composition, and the filled coatings include for curing from about 1 to about 10 parts by weight of the cationic polymerization initiator solution.

In one embodiment the cationic polymerization initiator includes one or more sulfonium salt catalysts in solution with a first carrier medium. For example, triarylsulfonium salt catalysts may be used, such as the mixture of triarylsulfonium salts having the general structures (V) and (VI)

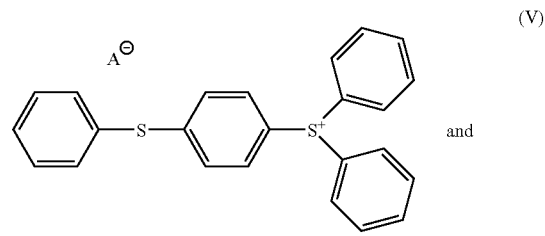

(V)

and

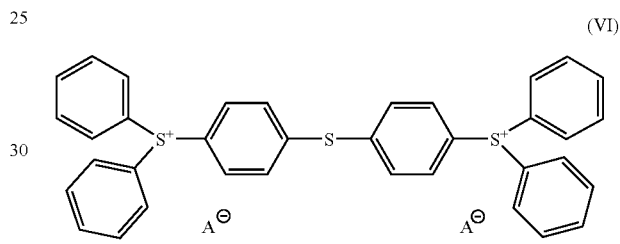

(VI)

wherein $A^-$ is a non-nucleophilic anion, commonly $[BF_4]^-$, $[PF_6]^-$, $[AsF_6]^-$, $[SbF_6]^-$, $[B(C_6F_5)_4]^-$, or $[Ga(C_6F_5)_4]^-$. It should be noted that a negatively charged moiety is conventionally indicated herein by a minus sign, either in a circle or without the circle. Each symbol is used interchangeably, and may be positioned as a superscript relative to the moiety. Similarly, a positively charged moiety is denoted by a plus symbol, with or without the circle.

An especially suitable mixture of triarylsulfonium salts for use in polymerizing the present compositions is the mixture of of S,S-diphenyl-4-thiophenoxyphenylsulfonium hexafluoroantimonate having structure (VA) and bis(diphenylsulfonio)-4,4'-diphenylsulfide bishexafluoroantimonate having structure (VIA). This triarlysulfonium salt mixture is commercially available from Polyset Company as PC-2505 or from Dow Chemical as Cyracure™ 6974.

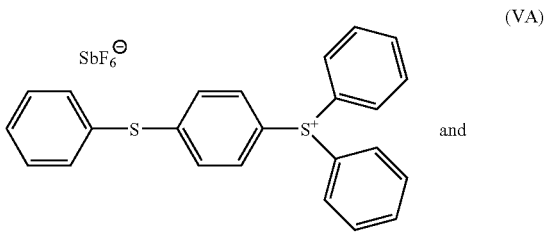

(VA)

and

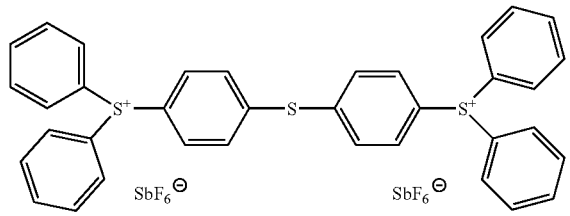
(VIA)

Alternatively, a mixture of S,S-diphenyl-4-thiophenoxyphenylsulfonium hexafluorophosphate having structure (VB) and bis(diphenylsulfonio)-4,4'-diphenylsulfide bishexafluorophosphate having structure (VIB) may be used to polymerize the present compositions. This triarlysulfonium salt mixture is commercially available from Polyset Company as PC-2514.

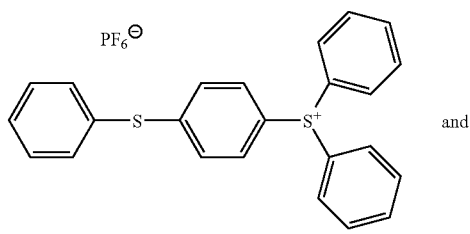
(VB)

and

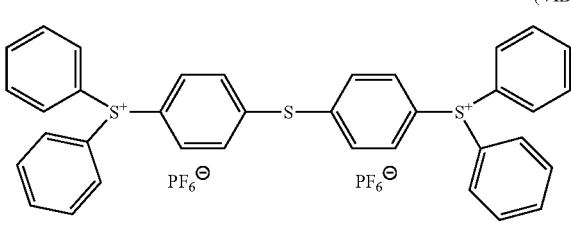
(VIB)

It should be noted, however, that the speed of curing the present formulations by U.V. or E-beam radiation is somewhat faster using the mixture of triarlysulfonium hexafluoroantimonate catalysts (VA) and (VIA) than using the similar hexafluorophosphate catalysts (VB) and (VIB).

Other suitable sulfonium salt catalysts for use in the cationic polymerization initiator include dialkylphenylacylsulfonium salts having formula (IV)

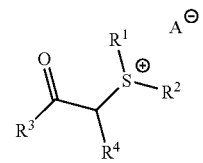
(IV)

wherein $R^1$ is a $C_1$ to $C_{30}$ monovalent organic radical; $R^2$ is a $C_1$ to $C_{30}$ monovalent organic radical, or $R^1$ and $R^2$ taken together may form a 5 or 6-membered ring; $R^3$ is $C_6$ to $C_{20}$ alkyl, aryl, $C_6$ to $C_{20}$ substituted alkyl or substituted aryl; $R^4$ is hydrogen or $C_1$ to $C_8$ alkyl; $A^-$ is a non-nucleophilic anion, such as one previously listed. $R^2$ may also be a photosensitizing residue.

Preferred compounds of structure (IV) are those in which the non-nucleophilic anion $A^-$ is one of the ones previously listed; $R^3$ is aryl or substituted aryl; $R^4$ is hydrogen; $R^1$ is $C_{14}$ to $C_{30}$ alkyl, aryl, $C_{14}$ to $C_{30}$ substituted alkyl of substituted aryl; and $R^2$ is $C_1$ to $C_{30}$ alkyl, aryl, $C_1$ to $C_{30}$ substituted alkyl or substituted aryl. Examples of suitable $R^3$ groups are phenyl; indan-1-one-2-yl; α-tetralone-2-yl; biphenylyl; naphthyl; perylenyl, pyrenyl, anthracenyl, tetracenyl, coronenyl, benzoylphenyl, 9-oxothioxanthenyl; and phenyl substituted with halogen, nitro or alkoxy. Preferably $R^4$ is hydrogen. One set of preferred embodiments is the genus in which $R^3$ is phenyl; $R^1$ is $C_8$ to $C_{30}$, preferably $C_4$ to $C_{30}$, alkyl; $R^2$ is lower alkyl; and $R^4$ is hydrogen. Preferred dialkylphenacylsulfonium salts are fully described in U.S. Pat. No. 6,031,014 to Crivello issued Feb. 29, 2000.

Another suitable sulfonium salt catalyst is that of structure (VII), which is commercially produced by Asahi Denka

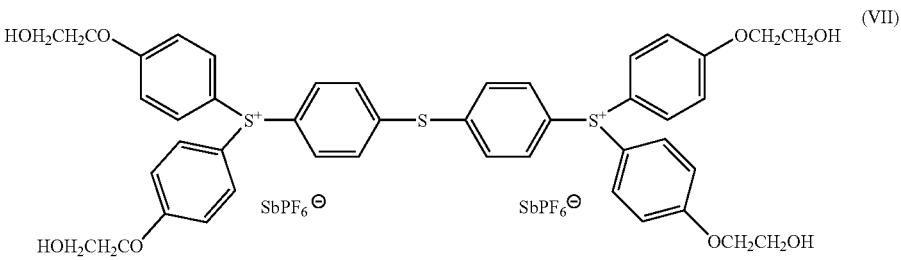
(VII)

As previously mentioned, each sulfonium salt catalyst or mixture thereof is present in solution with a first carrier medium. Exemplary carriers include propylene carbonate and monomers such as 3,4-epoxycyclohexylmethyl-3',4'-epoxycyclohexane carboxylate (EECH)(structure (IIA)) and bis(3,4-epoxycyclohexyl) adipate. However, the invention is not limited to these carriers, and other suitable carrier mediums would be obvious to one of ordinary skill. Bis(3,4-epoxycyclohexyl) adipate, which is available from Union Carbide as ERL 4299, has the following structure:

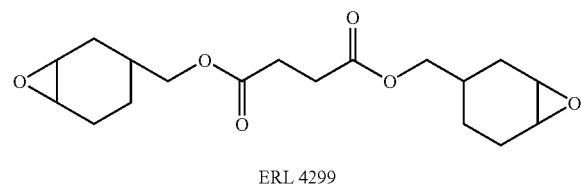

ERL 4299

An exemplary preferred cationic polymerization initiator comprises a catalyst solution containing about 50 wt. % of one of the mixtures of triarylsulfonium salts previously described, i.e. (i) S,S-diphenyl-4-thiophenoxyphenylsulfonium hexafluoroantimonate having structure (VA) and bis(diphenylsulfonio)-4,4'-diphenylsulfide bishexafluoroantimonate having structure (VIA); or (ii) S,S-diphenyl-4-thiophenoxyphenylsulfonium hexafluorophosphate having structure (VB) and bis(diphenylsulfonio)-4,4'-diphenylsulfide bishexafluorophosphate having structure (VIB). Also included in the catalyst solution is about 50 wt. % of one of the aforementioned carrier mediums. Preferably, the catalyst solution is about 50 wt. % of the mixture of salts having structures (VA) and (VIA) and about 50 wt. % propylene carbonate.

In another embodiment, the cationic polymerization initiator is a diaryliodonium salt catalyst of structure (III) in solution with a second carrier medium. This catalyst solution may be used alone to polymerize the formulations or in a blend with one of the aforementioned sulfonium salt catalyst solutions. Structure (III) is represented as:

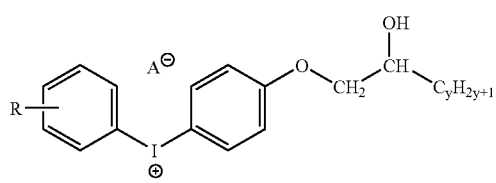

wherein R is methyl or hydrogen, and y is 0 or an integer from 1 to 25. When R is methyl, the methyl substituent may be located at any position of the aryl ring, i.e., at the 2, 3, or 4-carbon relative to the carbon attached to the iodine atom, which is identified as the 1-carbon. The 2-, 3-, and 4-carbon positions are also known as ortho-, meta-, and para-, as anyone of ordinary skill would know. $A^-$ is a non-nucleophilic anion, such as one of the ones previously listed.

Especially suitable diaryliodonium salt catalysts are: [4-(2-hydroxy-1-tetradecyloxy)-phenyl]phenyliodonium hexafluorophosphate having structure (IIIA); [4-(2-hydroxy-1-tetradecyloxy)-phenyl] 4-methylphenyliodonium hexafluorophosphate having structure (IIIB); [4-(2-hydroxy-1-tetradecyloxy)-phenyl] phenyliodonium hexafluoroantimonate having structure (IIIC); and [4-(2hydroxy-1-tetradecyloxy)-phenyl] 4-methylphenyliodonium hexafluoroantimonate having structure (IIID):

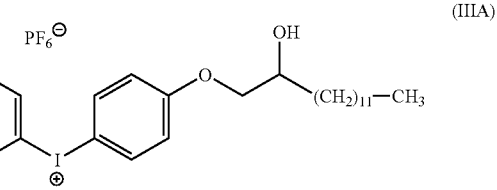

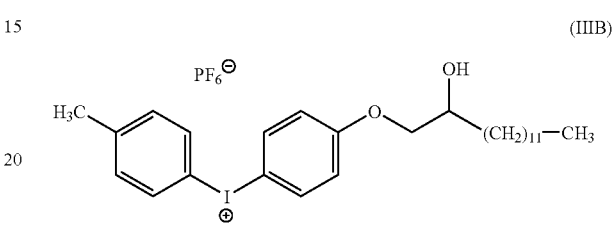

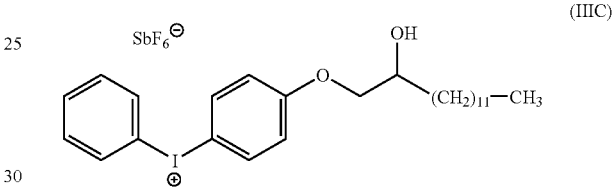

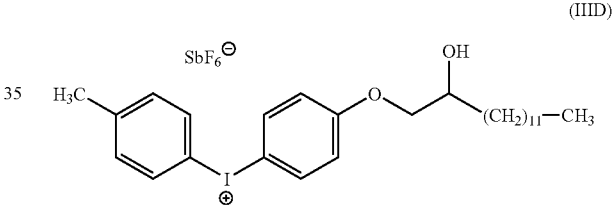

The fluorophosphate and fluoroantimonate diaryliodonium salt catalysts having structures (IIIA), (IIIB), (IIIC), and (IIID) are commercially available from Polyset Company, respectively, as PC-2508, PCX-2519, PC-2506, and PCX-2509. The most preferred fluorophosphate diaryliodonium salt is that of structure (IIIA), and the most preferred fluoroantimonate diaryliodonium salt is that of structure (IIIC).

For use in the cationic polymerization initiator, the diaryliodonium salt catalyst is separately dissolved in a second carrier medium, which may be the same as or different from the first carrier medium. Again, propylene carbonate and monomers such as 3,4-epoxycyclohexylmethyl-3',4'-epoxycyclohexane carboxylate (structure (IIA), or bis(3,4-epoxycyclohexyl) adipate may be used. An exemplary iodonium catalyst solution contains about 40 wt. % of the diaryliodonium salt and about 60 wt. % the corresponding carrier medium, which is typically 3,4-epoxycyclohexylmethyl-3',4'-epoxycyclohexane carboxylate (structure (IIA).

Furthermore, the cationic polymerization initiator may be a blend or mixture of the sulfonium salt catalyst solution and the diaryliodonium salt catalyst solution. One such exemplary initiator contains equal parts by weight of: (i) a first catalyst solution comprising about 50 wt. % of a mixture of S,S-diphenyl-4-thiophenoxyphenylsulfonium hexafluoroantimonate having structure (VA) and bis(diphenylsulfonio)-

4,4'-diphenylsulfide bishexafluoroantimonate having structure (VIA) and about 50 wt. % propylene carbonate; and (ii) a second catalyst solution comprising about 40 wt. % [4-(2-hydroxy-1-tetradecyloxy)-phenyl]phenyliodonium hexafluoroantimonate having structure (IIIC) and about 60 wt. % 3,4-epoxycyclohexylmethyl-3',4'-epoxycyclohexane carboxylate. However, the invention is not limited to the use of this mixture, and many other blends of sulfonium salt catalyst solutions and diaryliodonium salt catalyst solutions using the catalysts and carrier mediums disclosed herein may be used, as one of ordinary skill in the coating arts would know.

Thus, in the final formulations, the cationic polymerization initiator may contain an all sulfonium salt catalyst, an all diaryliodonium salt catalyst, or a mixture of sulfonium and iodonium salt catalysts. When the initiator is a mixture, equal parts by weight (50/50 wt. %) of the sulfonium salt catalyst solution and the diaryliodonium salt solution are generally employed.

The formulations of the present invention may be cured by U.V. or E-beam radiation. However, it should be noted that in some situations, the film may be slightly soft immediately after curing. The composition may then be baked in air at a temperature and time sufficient to obtain a film with desirable properties. As used herein, the term "postbake" refers to such a drying step. A typical postbake, which raises the substrate temperature to about 80° C.-125° C. for a period ranging from about 15 minutes to about an hour, is therefore often preferred for improving the properties of the cured films. Generally, an improvement in adhesion is observed regardless of the type and source of the substrate. However, it should be noted that the postbake is optional and is typically used simply to reduce the time after curing that improved film properties can be observed.

Depending on whether the formulation is to be cured by U.V. or E-beam radiation and whether the formulation is clear or filled, and depending on the application and substrate, the amount and the identity of the cationic polymerization initiator can be adjusted accordingly. For example, an all sulfonium salt catalyst solution, an all diaryliodonium salt catalyst solution, or a blend thereof may be used for both U.V. curing and E-beam curing—with or without a postbake. However, in straight U.V. curing, sulfonium salt catalysts are generally more efficient compared with diaryliodonium salts. In contrast, for E-beam curing, diaryliodonium salts are more efficient as a curing catalyst. For example, compositions containing an all diaryliodonium salt catalyst can be cured by E-beam at a 2-3 Mrad dosage lower than that needed to cure compositions containing an all sulfonium salt catalyst.

With respect to the clear formulations of the present invention, sulfonium salts, diaryliodonium salts, or a combination thereof, perform equally well in both U.V. and E-beam curing, with or without postbake. However, for opaque, pigmented formulations (including fillers, pigments, etc.), E-beam curing with or without postbake is the preferred curing process. Formulations containing dyes or low levels of pigmentation or containing semi-transparent fillers (fillers with very low hiding power), such as silicas, brytes, talcs, etc., may be cured by U.V. radiation with or without postbake using a U.V. bulb with a longer wavelength than that of the basic mercury lamp, especially for film thicknesses less than 0.5 mm. For example, microwave-powered lamps, such as H-bulbs, D-bulbs or V-bulbs are suitable, as would be obvious to one of ordinary skill.

The following Table provides exemplary amounts (parts by weight) of the cationic polymerization initiator needed for curing the formulations by U.V. or E-beam radiation when the initiator contains either an all sulfonium salt catalyst or an all iodonium salt catalyst. However, the Table is included for illustrative purposes only, and the invention is not limited to the listed amounts or to the particular catalysts, as one of skill would know. As listed in the Table, "Sulfonium" refers to a 50/50 (wt. %) solution of PC-2505 in propylene carbonate, and "Diaryliodonium" refers to a 40/60 (wt. %) solution of PC-2506 in 4221 (EECH).

| Cure (formulation) | Polymerization Initiator | Parts by Weight (based on 100 parts base resin) |
|---|---|---|
| U.V. (clear) | Sulfonium | 2-6 parts |
| U.V. (pigmented, dye-containing, and/or filled) | Sulfonium | 4-8 parts |
| E-beam (clear) | Sulfonium | 6-8 parts |
| E-beam (pigmented, dye-containing, and/or filled) | Sulfonium | 6-10 parts |
| U.V. (clear) | Diaryliodonium | 4-8 |
| U.V. (pigmented, dye-containing, and/or filled) | Diaryliodonium | 5-9 |
| E-beam (clear) | Diaryliodonium | 4-8 |
| E-beam (pigmented, dye-containing, and/or filled) | Diaryliodonium | 3-8 |

When a blend is used, equal parts by weight of the sulfonium salt catalyst solution and of the diaryliodonium salt catalyst solution are typically employed such that the total parts by weight of the cationic polymerization initiator in the final formulation does not exceed 10 parts by weight, but preferably does not exceed the upper limits listed in the Table. The resulting films after curing by E-beam or U.V. radiation using an all sulfonium salt catalyst, an all diaryliodonium salt catalyst or blend thereof exhibit good adhesion and are dry without being brittle.

The present invention also includes a method for manufacturing a coated article, as well as the coated article manufactured by the method. As used herein, the term "article" includes a wood, glass, plastic, or metal substrate. Applications include, but are not limited to, decorative, insulating, and protective coatings on such materials, as well as coatings on plastic for use in inkjet printers and Radio Frequency Identification (RFID) Tags, to name a few. In the method, a filled or clear formulation, as described herein, is first deposited onto the article by conventional techniques known in the art, such as spray or roll coating. Next, the composition applied to the article is cured by being exposed to E-beam radiation, typically ranging from about 3 to about 12 Mrad or to U.V. radiation, typically at a dose ranging from 500-2000 mJ/cm$^2$ and at a wavelength ranging from about 100 nm to about 400 nm. Furthermore, as previously described and if desired, the coated article may be subjected to a postbake step to improve the properties of the coating. Upon curing, the composition is polymerized to >90%.

The following examples are given by way of illustration and are not intended to be limitative of the present invention. Various combinations of resins (siloxanes and non-siloxane epoxies), flexibilizers, adhesion promoters, catalysts, etc., which provide the unexpected and desired cure speed and film properties after U.V. or E-beam exposure (with or without postbake) are provided in the examples. In addition, the fillers, dyes, pigments, and other additives used in the formulations described herein are readily available materials. Such materials can be conveniently prepared in accordance with conventional preparatory procedures or obtained from commercial sources.

Furthermore, as mentioned above, the catalyst solutions and blends included in both the filled and clear formulations may be adjusted according to the type of curing desired. Exemplary embodiments are found in, but not limited to, the formulations provided in the examples provided herein.

In the exemplary formulations cured by E-beam radiation, all coated substrates were cured in air using an AEB Lab Electron Beam Machine at a voltage between 80-120 Kv and a dose ranging from 3-12 Mrad, without any nitrogen blanket. Some exemplary formulations were instead cured in air by exposing the coated substrate to U.V. radiation at a dose ranging from 500-2000 mJ/cm$^2$ using an H-bulb, for example. However, curing by U.V. radiation may be effected using any source of U.V. light, e.g. mercury and xenon arc lamps, microwave-powered lamps, lasers, metal halide modified tungsten lamps and low pressure fluorescent lamps, such as germicidal lamps. The preferred U.V. lamps are microwave-powered lamps available from Fusion UV Systems, Inc., such as H bulbs, D bulbs, and V bulbs. Post-curing, denoted in the examples as "postbake", was done in an airflow convection oven (15 min. to 1 hour at 125° C. PMT).

Many coatings were evaluated on treated aluminum (AL 36) and steel (R 36-1) panels from Q-panels. AL 36 refers to a Q-Panel of aluminum with a chromate pretreatment, and R 36-1 refers to a Q-Panel of steel with Bondrite 1000 iron phosphate P60 chrome and deionized water rinse. No surface pre-treatment was done on the substrates other than cleaning the surface with methylene chloride or isopropanol or whatever was performed by metal panel suppliers.

Included in many of the following examples are one or more film properties measured for each formulation after curing, such as appearance (cured film), double rub test (ASTM D-5402-93); adhesion (ASTM D-3359), and bend test (ASTM D-522-88). In addition, the viscosity of some of the formulations was measured prior to curing. With respect to the double rub test, the number listed in the examples indicates how many cycles the material was rubbed from side to side in the presence of a solvent (methyl ethyl ketone-MEK) without any deterioration of the material. All formulations passed this test. With respect to the bend and adhesion tests, "pass" indicates that the material stayed adhered to the substrate and that there was no cracking. In contrast, "fail" would have indicated that the material cracked or delaminated from the panel.

The thickness of the films on the substrates ranged from about 0.5 to about 1.0 mm. The formulations provide the desirable processing parameters and film properties described herein.

The formulations in Examples 1-5 and 8-10 were E-beam cured at a voltage of 120 Kv and a dose of 8 Mrad, and their physical properties were measured. For comparison purposes, samples containing the same formulations were also postbaked for 15 min. at 125° C. immediately after the E-beam cure.

However, it should be noted that all formulations of the present invention including those found in the examples are curable by either E-beam or U.V. radiation with or without a postbake. Furthermore, the catalysts found in the exemplary formulations are for illustrative purposes only, and substitution with any cationic polymerization initiator described herein will also provide films having desirable properties.

PC-2505 (50%) refers to a 50/50 (wt. %) solution of PC-2505 in propylene carbonate, and PC-2506 (49%) refers to a 40/60 wt. % solution of PC-2506 in 4221 (EECH).

Clear, Unfilled Formulations

EXAMPLE 1

E-Beam Cure

Formulations containing the following components were prepared, cured, and tested:

| Component | Formulation | | |
| --- | --- | --- | --- |
| | 1A | 1B | 1C |
| | Parts by Weight | | |
| 4221 | 45 | 40 | — |
| PC-1000 | 45 | 40 | 40 |
| PC-2003 | 5 | 10 | 10 |
| Vikoflex 9010 | — | — | 40 |
| Capa 316/4101 | 10 | 10 | 10 |
| Silane A-187 | 2 | 2 | 2 |
| PC-2505 (50%) | 8 | 8 | 8 |

| | Formulation | | | | | |
| --- | --- | --- | --- | --- | --- | --- |
| | 1A | | 1B | | 1C | |
| Substrate | AL 36 | R 36-1 | AL36 | R 36-1 | AL36 | R 36-1 |
| Appearance | | | | | | |
| Fish Eye | None | None | None | None | None | None |
| Color | Clear | Clear | Clear | Clear | Clear | Clear |
| Cure (after E-beam) | Dry | Dry | Dry | Dry | Dry | Dry |
| Methyl ethyl ketone (MEK) (double rub) (ASTM D 5402-93) | | | | | | |
| After 7 days at room temperature | 50+ | 50+ | 50+ | 50+ | 50+ | 50+ |
| After Postbake | 50+ | 50+ | 50+ | 50+ | 50+ | 50+ |
| Adhesion Test (ASTM D 3359 Cross Hatch) | | | | | | |
| After 7 days at room temperature | Pass | Pass | Pass | Pass | Pass | Pass |
| T Bend Test (ASTM D 522-88) | | | | | | |
| After 7 days at room temperature | Pass (4T) | Pass (4T) | Pass (4T) | Pass (4T) | Pass (3T) | Pass (3T) |

EXAMPLE 2

E-Beam Cure

Formulations containing the following components were prepared, cured, and tested:

| Component | Formulation | |
| --- | --- | --- |
| | 2A | 2B |
| | Parts by Weight | |
| 4221 | 40 | 40 |
| PC-1000 | 40 | 40 |
| PC-2003 | 10 | 8 |

-continued

| Component | Formulation 2A | Formulation 2B |
|---|---|---|
| | Parts by Weight | |
| Hycar CTBN (1300 × 31) | 10 | 12 |
| Silane A187 | 2 | 2 |
| Irganox 1035 | 0.4 | 0.4 |
| PC-2505 (50%) | 8 | 8 |

| | Formulation 2A | | Formulation 2B | |
|---|---|---|---|---|
| Substrate | AL 36 | R 36-1 | AL 36 | R 36-1 |
| Appearance | | | | |
| Fish eye | None | None | None | None |
| Clarity | Clear | Clear | Clear | Clear |
| Cure (after E-beam) | Dry | Dry | Dry | Dry |
| Methyl ethyl ketone (MEK) (double rub) (ASTM D 5402-93) | | | | |
| After 7 days at room temperature | 50+ | 50+ | 50+ | 50+ |
| After Postbake | 50+ | 50+ | 50+ | 50+ |
| Adhesion Test (ASTM D3359 Cross Hatch) | | | | |
| After 7 days at room temperature | Pass | Pass | Pass | Pass |
| 1T Bend Test (ASTM D 522-88) | | | | |
| After 7 days at room temperature | Pass (3T) | Pass (3T) | Pass (2-3T) | Pass (2-3T) |

EXAMPLE 3

E-Beam Cure

Formulations containing the following components were prepared, cured, and tested:

| Component | Formulation 3A | Formulation 3B | Formulation 3C |
|---|---|---|---|
| | Parts by Weight | | |
| Araldite 6084/4221 (20/80) | — | — | 45 |
| 4221 | 40 | 40 | — |
| PC-1000 | 40 | 40 | 45 |
| PC-2003 | 10 | 5 | 10 |
| Poly bd 605E | 10 | — | — |
| Hycar CTB (2000 × 162) | — | 20 | — |
| Irganox 1035 | 0.4 | 0.4 | — |
| Silane A-187 | 2 | 2 | 2 |
| PC-2505 (50%) | 8 | 8 | 6 |

| | Formulation 3A | | 3B | | 3C | |
|---|---|---|---|---|---|---|
| Substrate | AL 36 | R 36-1 | AL36 | R 36-1 | AL36 | R 36-1 |
| Appearance | | | | | | |
| Fish Eye | None | None | None | None | None | None |
| Color | Clear | Clear | Clear | Clear | Clear | Clear |
| Cure (after E-beam) | Dry | Dry | Dry | Dry | Dry | Dry |
| Methyl ethyl ketone (MEK) (double rub) (ASTM D 5402-93) | | | | | | |
| After 7 days at room temperature | 50+ | 50+ | 50+ | 50+ | 50+ | 50+ |
| After Postbake | 50+ | 50+ | 50+ | 50+ | 50+ | 50+ |
| Adhesion Test (ASTM D 3359 Cross Hatch) | | | | | | |
| After 7 days at room temperature | Pass | Pass | Pass | Pass | Pass | Pass |
| T Bend Test (ASTM D 522-88) | | | | | | |
| After 7 days at room temperature | Pass (4T) | Pass (4T) | Pass (4T) | Pass | Pass (3T) | Pass (3T) |

EXAMPLE 4

E-Beam Cure

Formulations containing the following components were prepared, cured, and tested:

| Component | 4A | 4B | 4C | 4D |
|---|---|---|---|---|
| | Parts by Weight | | | |
| Araldite 6084/4221 (20/80) | — | — | 40 | 40 |
| 4221 | — | 40 | — | — |
| PC-1000 | 47 | 40 | 40 | 30 |
| PC-2003 | 5 | 5 | 5 | 10 |
| OXT 121 (XDO) | — | 10 | 10 | 10 |
| OXT 221 (DOX) | 47 | 10 | 10 | 10 |
| Capa 316/4101 | 10 | — | — | — |
| Silane A187 | 2 | 2 | 2 | 2 |
| PC-2505 (50%) | 6 | 6 | 6 | 6 |

|  | Formulation | | | | | | | |
|---|---|---|---|---|---|---|---|---|
|  | 4A | | 4B | | 4C | | 4D | |
| Substrate | AL 36 | R 36-1 | AL 36 | R 36-1 | AL 36 | R 36 1 | AL 36 | R 36 1 |
| Appearance | | | | | | | | |
| Fish eye | None | None | None | None | None | None | None | None |
| Clarity | Clear | Clear | Clear | Clear | Clear | Clear | Clear | Clear |
| Cure (after E-beam) | Dry | Dry | Dry | Dry | Dry | Dry | Dry | Dry |
| Methyl ethyl ketone (MEK) (double rub) (ASTM D 5402-93) | | | | | | | | |
| After 7 days at room temperature | 40 | 40 | 50+ | 50+ | 50+ | 50+ | 50+ | 50+ |
| After Postbake | 50+ | 50+ | 50+ | 50+ | 50+ | 50+ | 50+ | 50+ |
| Adhesion Test (ASTM D3359 Cross Hatch) (ASTM D 5402-93) | | | | | | | | |
| After 7 days at room temperature | Pass | Pass | Pass | Pass | Pass | Pass | Pass | Pass |
| T Bend Test (ASTM D 522-88) | | | | | | | | |
| After 7 days at room temperature | Pass | Pass | Pass | Pass | Pass (5T) | Pass (5T) | Pass (6T) | Pass (6T) |

EXAMPLE 5

E-Beam Cure

Formulations containing the following components were prepared, cured, and tested:

|  | Formulation | | | |
|---|---|---|---|---|
|  | 5A | 5B | 5C | 5D |
| Component | Parts by Weight | | | |
| 4221 | 32 | 30 | 36 | 36 |
| PC-1000 | — | 40 | 36 | 36 |
| PC-2003 | 10 | 5 | 10 | 10 |
| Hycar CTBN (1300 × 21) | 8 | 10 | 8 | 8 |
| CHVE | 40 | 20 | — | — |
| DDVE | — | — | — | 10 |
| HBVE | — | — | 10 | — |
| Silane A187 | 2 | 2 | 2 | 2 |
| PC-2505 (50%) | 8 | 8 | 8 | 8 |
| Vikolox 14 | 10 | — | — | — |

|  | Formulation | | | | | | | |
|---|---|---|---|---|---|---|---|---|
|  | 5A | | 5B | | 5C | | 5D | |
| Substrate | AL 36 | R 36-1 | AL 36 | R 36-1 | AL 36 | R 36 1 | AL 36 | R 36 1 |
| Appearance | | | | | | | | |
| Fish eye | None | None | None | None | None | None | None | None |
| Clarity | Clear | Clear | Clear | Clear | Clear | Clear | Clear | Clear |
| Cure (after E-beam) | Dry | Dry | Dry | Dry | Dry | Dry | Dry | Dry |
| Methyl ethyl ketone (MEK) (double rub) (ASTM D 5402-93) | | | | | | | | |
| After 7 days at room temperature | 50+ | 50+ | 50+ | 50+ | 40+ | 40+ | 50+ | 50+ |
| After Postbake | 50+ | 50+ | 50+ | 50+ | 50+ | 50+ | 50+ | 50+ |

-continued

| | Formulation | | | | | | | |
|---|---|---|---|---|---|---|---|---|
| | 5A | | 5B | | 5C | | 5D | |
| Substrate | AL 36 | R 36-1 | AL 36 | R 36-1 | AL 36 | R 36 1 | AL 36 | R 36 1 |
| Adhesion Test (ASTM D3359 Cross Hatch) | | | | | | | | |
| After 7 days at room temperature. | Pass | Pass | Pass | Pass | Pass | Pass | Pass | Pass |
| T Bend Test (ASTM D 522-88) | | | | | | | | |
| After 7 days at room temperature. | Pass (4T) | Pass (4T) | Pass (2T) | Pass (2T) | Pass (4T) | Pass (4T) | Pass (4T) | Pass (4T) |

Filled Formulations

EXAMPLE 6

White Ink for Ink Jet Printer

Formulations containing the following components were prepared and cured:

| | Formulation | | |
|---|---|---|---|
| | 6A | 6B | 6C |
| Component | Parts by Weight | | |
| 4221 | 38 | 38 | — |
| PC-1000 | 38 | 21 | 38 |
| PC-2003 | 5 | 15 | 5 |
| Capa 316/4101 | 8 | 10 | 8 |
| Byk 307 | 0.2 | 0.2 | 0.2 |
| TiO$_2$ (Kronos) 2020 | 10 | 10 | 10 |
| PC-2505 (50%) | 6 | 6 | 6 |
| OXT 221 (DOX) | — | — | 38 |

The formulations in Example 6 are curable by U.V. radiation (500-1500 mJ/cm$^2$, H-bulb) or by E-beam radiation (6-12 Mrad, 120 Kv) with or without a postbake (15 min. at 125° C.) over metal, glass, or plastic substrates. Adhesions, solvent resistances, and pot life at 60-80° C. were very good, meeting industry requirements.

EXAMPLE 7

Silver Filled Formulations for Radio Frequency Identification (RFID) Tags

Base resin (I) having the following composition was prepared:

| Component | Parts by Weight |
|---|---|
| 4221 | 40 |
| PC-1000 | 40 |
| PC-2003 | 5 |
| OXT 121 (XDO) | 10 |
| OXT 221 (DOX) | 10 |

Formulations containing Base Resin (I) and the following other components were prepared and cured:

| | Formulation | | |
|---|---|---|---|
| | 7A | 7B | 7C |
| Component | Parts by Weight | | |
| Base Resin (I) | 17.6 | 17.6 | 17.6 |
| Silane A 187 | 0.3 | 0.3 | 0.3 |
| Silver Flake (AAR-0595) | 80 | 80 | 80 |
| Aerosil (R-972) | 0.6 | 0.6 | 0.6 |
| PC-2506 (40%) | 0.7 | 1.4 | — |
| PC-2505 (50%) | 0.7 | — | 1.4 |
| Viscosity at 25° C. | 1150 cps | 1150 cps | 1150 cps |

The formulations in Example 7 are curable by U.V. radiation (1000-2000 mJ/cm$^2$, H-bulb) or by E-beam radiation (6-12 Mrad at 120 Kv) with or without a postbake (15 min. at 125° C.) on various substrates, but particularly on plastics or films for RFID. tags. A sulfonium salt catalyst, e.g. PC-2505, is preferred for systems needing high temperature (60-80° C.) stability, whereas for screen printing applications where no high temperature pot life is needed, a diaryliodonium salt catalyst, such as PC-2506 is preferred, particularly for E-beam cure with or without postbake or U.V. plus postbake cure.

EXAMPLE 7A

Silver Filled Formulations for Ink Jet Formulations

The formulations of Example 7 are altered by replacing part or all of the silver flakes with silver or silver-coated copper nanopowder of appropriate particle sizes (<100 nm), such as that available from Sigma-Aldrich. This avoids the problem of clogging the ink jet application head with silver flakes. The formulations may be cured as described in Example 7.

EXAMPLE 8

Metal Primer

E-Beam Cure

Base resin (II) having the following composition was prepared:

| Component | Parts by Weight |
| --- | --- |
| 4221 | 42 |
| PC-1000 | 42 |
| PC-2003 | 8 |
| Hycar CTBN 1300 × 31 | 12 |

Formulations containing Base Resin (II) and the following other components were prepared, cured, and tested:

| | Formulation | |
| --- | --- | --- |
| | 8A | 8B |
| Component | Parts by Weight | |
| Base Resin (II) | 45 | 45 |
| Barytes, 1µ Cimbar EX or MPSI4721 | 30 | 30 |
| Nytal 300 (talc) | 20 | 20 |
| Silane A187 | 1 | 1 |
| PC-2506 (40%) | 4 | — |
| PC-2505 (50%) | — | 4 |

| | Formulation | | | |
| --- | --- | --- | --- | --- |
| | 8A | | 8B | |
| Substrate | AL 36 | R 36-1 | AL 36 | R 36-1 |
| Appearance | | | | |
| Cure (after E-beam) | Dry | Dry | Dry | Dry |
| Methyl ethyl ketone (MEK) (double rub) (ASTM D 5402-93) | | | | |
| After 7 days at room temperature | 50+ | 50+ | 50+ | 50+ |
| After Postbake | 50+ | 50+ | 50+ | 50+ |
| Adhesion Test (ASTM D 3359 Cross Hatch) | | | | |
| After 7 days at room temperature | Pass | Pass | Pass | Pass |
| T Bend Test (ASTM D 522-88) | | | | |
| After 7 days at room temperature | Pass (3-4T) | Pass (3-4T) | Pass (4T) | Pass (4T) |

EXAMPLE 9

White Top Coat

E-Beam Cure

Base resin (III) having the following composition was prepared:

| Component | Parts by Weight |
| --- | --- |
| 4221 | 41 |
| PC-1000 | 41 |
| PC-2003 | 10 |
| Hycar CTBN 1300 × 31 | 8 |
| Irganox 1035 | 0.4 |

Formulations containing Base Resin (III) and the following other components were prepared, cured, and tested:

| | Formulation | |
| --- | --- | --- |
| | 9A | 9B |
| Component | Parts by Weight | |
| Base Resin (III) | 58 | 58 |
| Byk 307 | 0.4 | 0.4 |
| TiO$_2$ (KRONOS 2160) | 36 | 36 |
| Silane A187 | 1 | 1 |
| Byk 501 | 0.2 | 0.2 |
| PC-2506 (40%) | 4.5 | — |
| PC-2505 (50%) | — | 4.5 |

| | Formulation | | | |
| --- | --- | --- | --- | --- |
| | 9A | | 9B | |
| Substrate | AL 36 | R 36-1 | AL 36 | R 36-1 |
| Appearance | | | | |
| Cure (after E-beam) | Dry | Dry | Dry | Dry |
| Methyl ethyl ketone (MEK) (double rub) (ASTM D 5402-93) | | | | |
| After 7 days at room temperature | 50+ | 50+ | 50+ | 50+ |
| After Postbake | 50+ | 50+ | 50+ | 50+ |
| Adhesion Test (ASTM D 3359 Cross Hatch) | | | | |
| After 7 days at room temperature | Pass | Pass | Pass | Pass |
| T Bend Test (ASTM D 522-88) | | | | |
| After 7 days at room temperature | Pass (2-3T) | Pass (2-3T) | Pass (3T) | Pass (3T) |

EXAMPLE 10

White Top Coat

Base resin (IV) having the following composition was prepared:

| Component | Parts by Weight |
| --- | --- |
| CTB: PC-1000 Adduct (50/50) | 40 |
| 4221 | 25 |
| PC-1000 | 25 |
| PC-2003 | 5 |
| CHVE | 10 |

Formulations containing Base Resin (IV) and the following other components were prepared, cured, and tested:

| Component | Formulation 10A | 10B | 10C |
|---|---|---|---|
| | Parts by Weight | | |
| Base Resin (IV) | 60 | 60 | 60 |
| Byk 307 | 0.4 | 0.4 | 0.4 |
| TiO₂ (Kronos 2160) | 36 | 36 | 36 |
| PC-2506 (40%) | 4 | — | 2 |
| PC-2505 (50%) | — | 4 | 2 |

| | Formulation | | | | | |
|---|---|---|---|---|---|---|
| | 10A | | 10B | | 10C | |
| Substrate | AL 36 | R 36-1 | AL36 | R 36-1 | AL36 | R 36-1 |
| Appearance | | | | | | |
| Cure (after E-beam) | Dry | Dry | Dry | Dry | Dry | Dry |
| Methyl ethyl ketone (MEK) (double rub) (ASTM D 5402-93) | | | | | | |
| After 7 days at room temperature | 50+ | 50+ | 45 | 45 | 50+ | 50+ |
| After Postbake | 50+ | 50+ | 50+ | 50+ | 50+ | 50+ |
| Adhesion Test (ASTM D 3359 Cross Hatch) | | | | | | |
| After 7 days at room temperature | Pass | Pass | Pass | Pass | Pass | Pass |
| T Bend Test (ASTM D 522-88) | | | | | | |
| After 7 days at room temperature | Pass (3-4T) | Pass (3-4T) | Pass (4T) | Pass (4T) | Pass (4T) | Pass (4T) |

The unique and specific combination of the specific ingredients in the exact amounts and proportions allow the formulations of the present invention to exhibit the excellent film properties shown in the above examples. The mere combination of these ingredients or similar ingredients does not guarantee a coating having satisfactory film properties. The specific cycloaliphatic epoxy functional siloxanes in the exact proportions described herein must be used. The same is true for the non-silicon-containing epoxy resins, flexibilizers, diluents, adhesion promoters, and sulfonium and/or diaryliodonium catalysts, as well as for the fillers, pigments, dyes, diluents, tougheners, flow control agents, antifoaming agents, and other additives.

The terminology used herein is as follows:

A "monovalent organic radical" refers to any residue that can be covalently attached to a sulfur and subsequently reacted with an .alpha.-haloketone to produce an acyl sulfonium salt. Preferred $C_{14}$ to $C_{30}$ monovalent organic radicals and $C_1$ to $C_{30}$ monovalent organic radicals of the claimed invention include alkyl, alkenyl, and alkynyl residues, aryl residues, arylalkyl residues, and oxygenated derivatives thereof.

"Alkyl" is intended to include linear, branched, or cyclic hydrocarbon structures and combinations thereof. Lower alkyl refers to alkyl groups of from 1 to 4 carbon atoms. Examples of lower alkyl groups include methyl, ethyl, propyl, isopropyl, butyl, s-and t-butyl and the like. Preferred alkyl groups are those of $C_{30}$ or below. Cycloalkyl is a subset of alkyl and includes cyclic hydrocarbon groups of from 3 to 8 carbon atoms. Examples of cycloalkyl groups include c-propyl, c-butyl, c-pentyl, c-hexyl, norbornyl and the like.

"Alkoxy" or "alkoxyl" refers to groups of from 1 to 20 carbon atoms of a straight, branched, cyclic configuration and combinations thereof attached to the parent structure through an oxygen. Examples include methoxy, ethoxy, propoxy, isopropoxy, cyclopropyloxy, cyclohexyloxy and the like. "Lower-alkoxy" refers to groups containing one to four carbons.

"Acyl" refers to groups of from 1 to 8 carbon atoms of a straight, branched, cyclic configuration, saturated, unsaturated and aromatic and combinations thereof, attached to the parent structure through a carbonyl functionality. Examples include acetyl, benzoyl, propionyl, isobutyryl, t-butoxycarbonyl, benzyloxycarbonyl and the like. "Lower-acyl" refers to groups containing one to four carbons.

"Aryl" and "heteroaryl" mean a 5- or 6-membered aromatic or heteroaromatic ring containing 0-3 heteroatoms selected from O, N, or S; a bicyclic 9- or 10-membered, partially or fully aromatic or heteroaromatic ring system containing 0-3 heteroatoms selected from O, N, or S; or a tricyclic 13- or 14-membered partially or fully aromatic or heteroaromatic ring system containing 0-3 heteroatoms selected from O, N, or S. The aromatic 6- to 14-membered carbocyclic rings include, e.g., benzene, naphthalene, indane, tetralin, and fluorene and the 5- to 10-membered aromatic heterocyclic rings include, e.g., imidazole, pyridine, indole, thiophene, benzopyranone, thiazole, furan, benzimidazole, quinoline, isoquinoline, quinoxaline, pyrimidine, pyrazine, tetrazole and pyrazole.

"Arylalkyl" means an alkyl residue attached to an aryl ring. Examples are benzyl, phenethyl and the like.

"Substituted alkyl" and "substituted aryl" refer to alkyl and aryl wherein up to three H atoms in each residue are replaced with halogen, hydroxy, loweralkoxy, carboxy, carboalkoxy, oxy, carboxamido, cyano, $NO_2$, sulfoxide, sulfone, acylamino, amidino, phenyl, benzyl, heteroaryl, phenoxy, benzyloxy, or heteroaryloxy.

Each of the patents and patent applications mentioned herein is hereby incorporated by reference in its entirety.

The invention has been described in detail with particular reference to preferred embodiments thereof, but it will be understood by those skilled in the art that variations and modifications can be effected within the spirit and scope of the invention.

I claim:

1. A clear coating composition comprising from about 90 to about 100 parts by weight of a base resin; from 0 to about 3 parts by weight of an adhesion promoter; and from about 2 to about 10 parts by weight of a cationic polymerization initiator, based on the total weight of the composition, wherein said base resin comprises:

(A) from about 30 to about 55 parts by weight of a cycloaliphatic epoxy functional siloxane monomer having structure (IA)

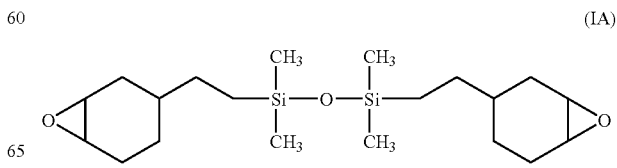

(IA)

(B) from about 5 to about 30 parts by weight of a cycloaliphatic epoxy functional siloxane oligomer having structure (IB)

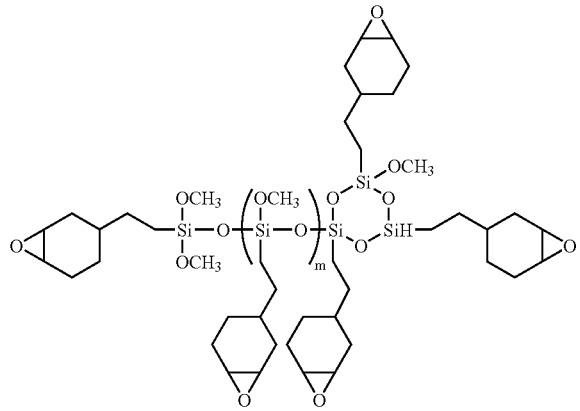

wherein m is an integer having a value from 5 to 50;

(C) from about 20 to about 55 parts by weight of at least one non-silicon-containing epoxy resin selected from the group consisting of (i) epoxidized vegetable oils, (ii) epoxidized vegetable oil esters, and (iii) 3,4-epoxycyclohexylmethyl-3',4'-epoxycyclohexane carboxylate having structure (IIA)

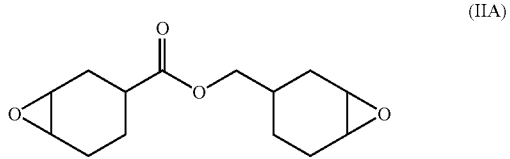

and (D) from 0 to about 60 parts by weight of one or more flexibilizers; wherein said cationic polymerization initiator is selected from the group consisting of (i) at least one sulfonium salt catalyst in solution with a first carrier medium; (ii) a diaryliodonium salt catalyst in solution with a second carrier medium; and (iii) mixtures of (i) and (ii).

2. The clear coating composition of claim 1, wherein said cationic polymerization initiator is a mixture of triarylsulfonium salt catalysts having structures (V) and (VI) in solution with said first carrier medium:

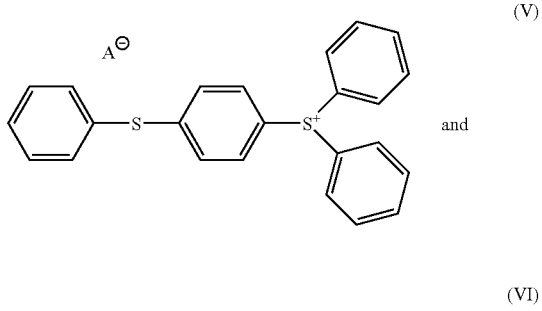

wherein A⁻ is a non-nucleophilic anion selected from the group consisting of $[BF_4]^-$, $[PF_6]^-$, $[AsF_6]^-$, $[SbF_6]^-$, $[B(C_6F_5)_4]^-$, and $[Ga(C_6F_5)_4]^-$.

3. The clear coating composition of claim 2, wherein said first carrier medium is selected from the group consisting of 3,4-epoxycyclohexylmethyl-3',4'-epoxycyclohexane carboxylate, bis(3,4-epoxycyclohexyl) adipate, and propylene carbonate.

4. The clear coating composition of claim 1, wherein said cationic polymerization initiator is a sulfonium salt catalyst having structure (VII) or (IV) in solution with said first carrier medium:

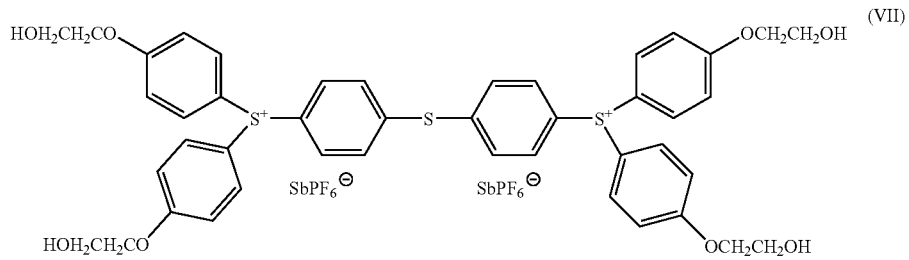

wherein R¹ is a $C_1$ to $C_{30}$ monovalent organic radical; R² is a $C_1$ to $C_{30}$ monovalent organic radical, or R¹ and R² taken together may form a 5 or 6-membered ring; R³ is $C_6$ to $C_{20}$ alkyl, aryl, $C_6$ to $C_{20}$ substituted alkyl or substituted aryl; R⁴ is hydrogen or $C_1$ to $C_8$ alkyl; A⁻ is a non-nucleophilic anion selected from the group consisting of $[BF_4]^-$, $[PF_6]^-$, $[AsF_6]^-$, $[SbF_6]^-$, $[B(C_6F_5)_4]^-$, and $[Ga(C_6F_5)_4]^-$.

5. The clear coating composition of claim 1, wherein said cationic polymerization initiator is a catalyst solution comprising about 50 wt. % of a mixture of triarylsulfonium salt catalysts selected from the group consisting of (i) S,S-diphenyl-4-thiophenoxyphenylsulfonium hexafluoroantimonate having structure (VA) and bis(diphenylsulfonio)-4,4'-diphenylsulfide bishexafluoroantimonate having structure (VIA):

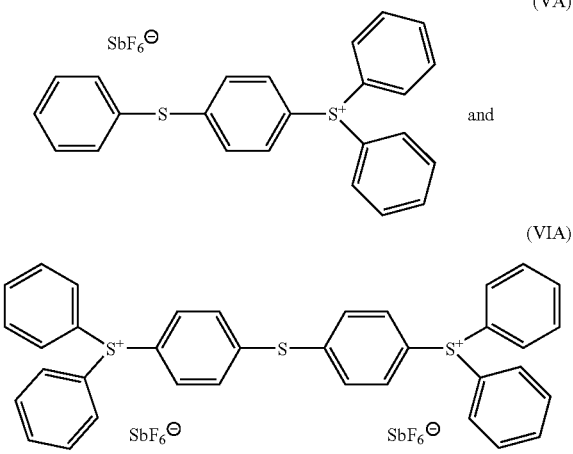

and (ii) S,S-diphenyl-4-thiophenoxyphenylsulfonium hexafluorophosphate having structure (VB) and bis(diphenylsulfonio)-4,4'-diphenylsulfide bishexafluorophosphate having structure (VIB):

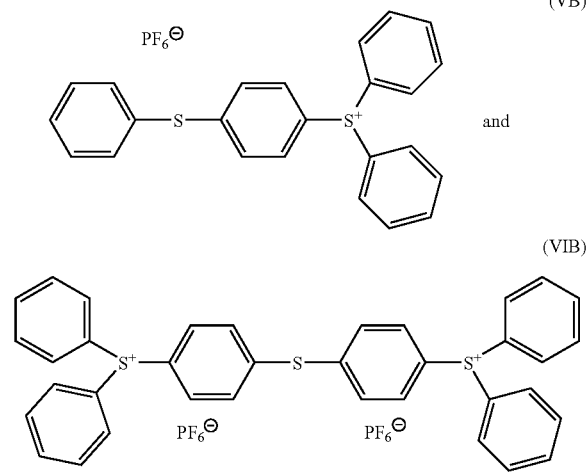

and about 50 wt. % of said first carrier medium selected from the group consisting of 3,4-epoxycyclohexylmethyl-3',4'-epoxycyclohexane carboxylate, bis(3,4-epoxycyclohexyl) adipate, and propylene carbonate.

6. The clear coating composition of claim 5, wherein said mixture of triarylsulfonium salt catalysts is a mixture of S,S-diphenyl-4-thiophenoxyphenylsulfonium hexafluoroantimonate having structure (VA) and bis(diphenylsulfonio)-4,4'-diphenylsulfide bishexafluoroantimonate having structure (VIA) and said first carrier medium is propylene carbonate.

7. The clear coating composition of claim 1, wherein said cationic polymerization initiator is a diaryliodonium salt catalyst having structure (III) in solution with said second carrier medium:

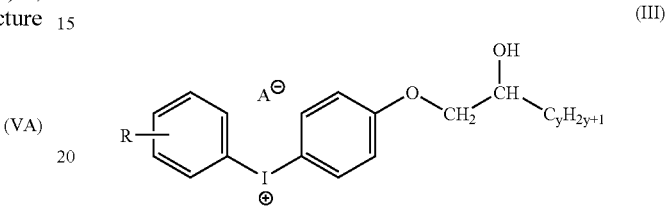

wherein R is methyl or hydrogen; y is 0 or an integer from 1 to 25; and A⁻ is a non-nucleophilic anion selected from the group consisting of $[BF_4]^-$, $[PF_6]^-$, $[AsF_6]^-$, $[SbF_6]^-$, $[B(C_6F_5)_4]^-$, and $[Ga(C_6F_5)_4]^-$.

8. The clear coating composition of claim 7, wherein said diaryliodonium salt catalyst is selected from the group consisting of [4-(2-hydroxy-1-tetradecyloxy)-phenyl] phenyliodonium hexafluorophosphate having structure (IIIA), [4-(2-hydroxy-1-tetradecyloxy)-phenyl] 4-methylphenyliodonium hexafluorophosphate having structure (IIIB), [4-(2-hydroxy-1-tetradecyloxy)-phenyl] phenyliodonium hexafluoroantimonate having structure (IIIC), and [4-(2-hydroxy-1-tetradecyloxy)-phenyl] 4-methylphenyliodonium hexafluoroantimonate having structure (IIID):

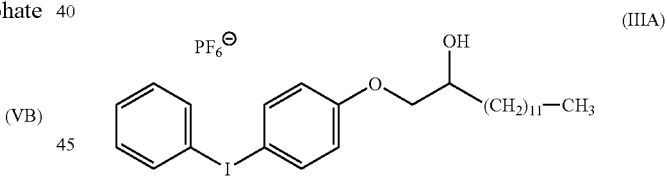

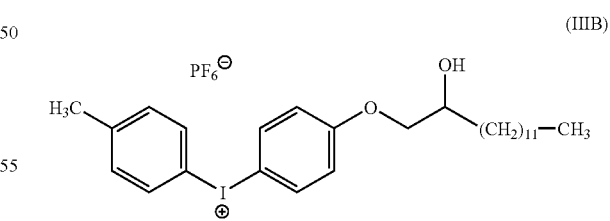

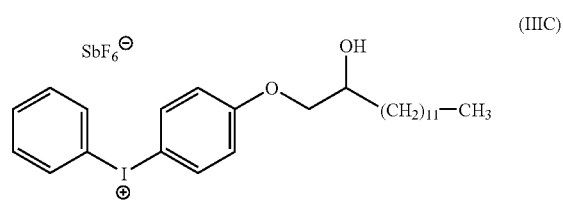

-continued

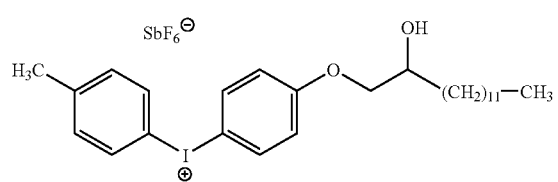

(IIID)

and wherein said second carrier medium is selected from the group consisting of 3,4-epoxycyclohexylmethyl-3',4'-epoxycyclohexane carboxylate, bis(3,4-epoxycyclohexyl) adipate, and propylene carbonate.

9. The clear coating composition of claim 1, wherein said cationic polymerization initiator comprises equal parts by weight of:

(i) a first catalyst solution comprising about 50 wt. % of a mixture of S,S-diphenyl-4-thiophenoxyphenylsulfonium hexafluoroantimonate having structure (VA)

and bis(diphenylsulfonio)-4,4'-diphenylsulfide bis-hexafluoroantimonate having structure (VIA):

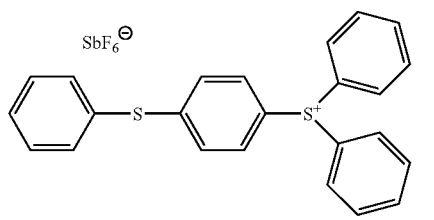

(VA)

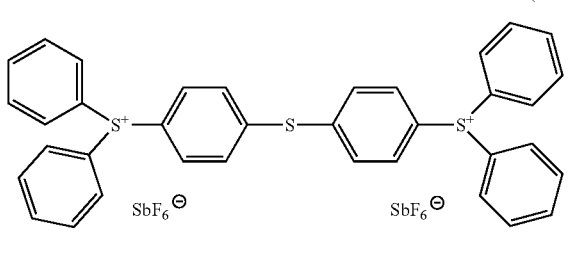

(VIA)

and about 50 wt. % propylene carbonate; and (ii) a second catalyst solution comprising about 40 wt. % [4-(2-hydroxy-1-tetradecyloxy)-phenyl]phenyliodonium hexafluoroantimonate having structure (IIIC)

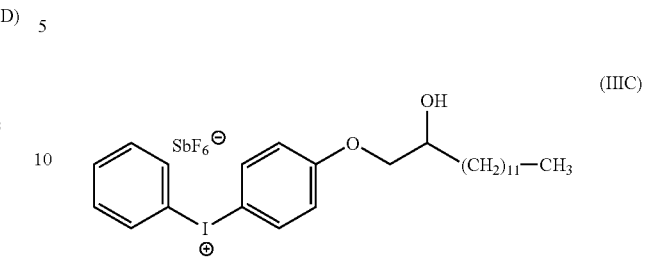

(IIIC)

about 60 wt. % 3,4-epoxycyclohexylmethyl-3',4'-epoxycyclohexane carboxylate.

10. The clear coating composition of claim 1, wherein said adhesion promoter is 3-glycidyloxypropyltrimethoxysilane or 2-(3,4-epoxycyclohexyl)-ethyl trimethoxysilane.

11. The clear coating composition of claim 1, wherein said one or more flexibilizers is selected from the group consisting of (i) epoxides based on a diglycidyl ether of bisphenol A having structure (IIB)

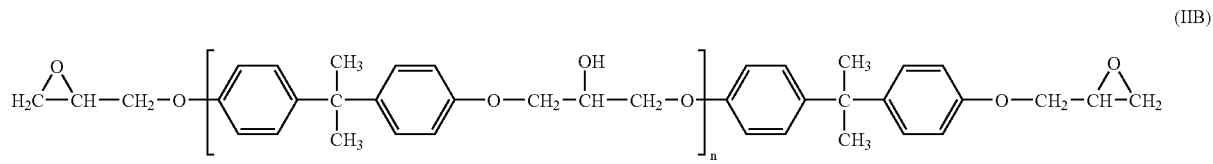

(IIB)

wherein the average value of n is 0 or about 0.07, 0.14, 2.3 or 4.8; (ii) epoxidized alpha olefins; (iii) limonene oxides; (iv) thermoplastic acrylic resins; (v) elastomers; (vi) phenoxy resins; (vii) polyol flexibilizers; (viii) allyl ethers; (ix) hydroxyl-terminated epoxidized polybutadienes; (x) carboxyl-terminated polybutadiene; (xi) carboxyl-terminated polybutadiene acrylonitrile; (xii) phenolic antioxidants; (xiii) oxetane monomers; and (xiv) vinyl ethers.

12. A filled coating composition comprising from about 15 to about 90 parts by weight of a base resin; from about 10 to about 85 parts by weight of one or more components selected from the group consisting of fillers, dyes, pigments, and additives; from 0 to about 1 part by weight of an adhesion promoter; and from about 1 to about 10 parts by weight of a cationic polymerization initiator, based on the total weight of the composition wherein said base resin comprises:

(A) from about 30 to about 55 parts by weight of a cycloaliphatic epoxy functional siloxane monomer having structure (IA)

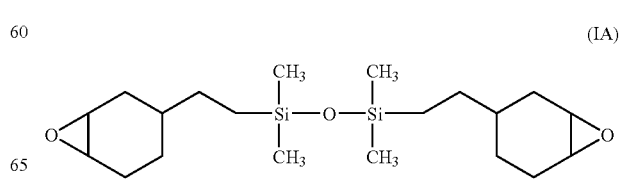

(IA)

(B) from about 5 to about 30 parts by weight of a cycloaliphatic epoxy functional siloxane oligomer having structure (IB)

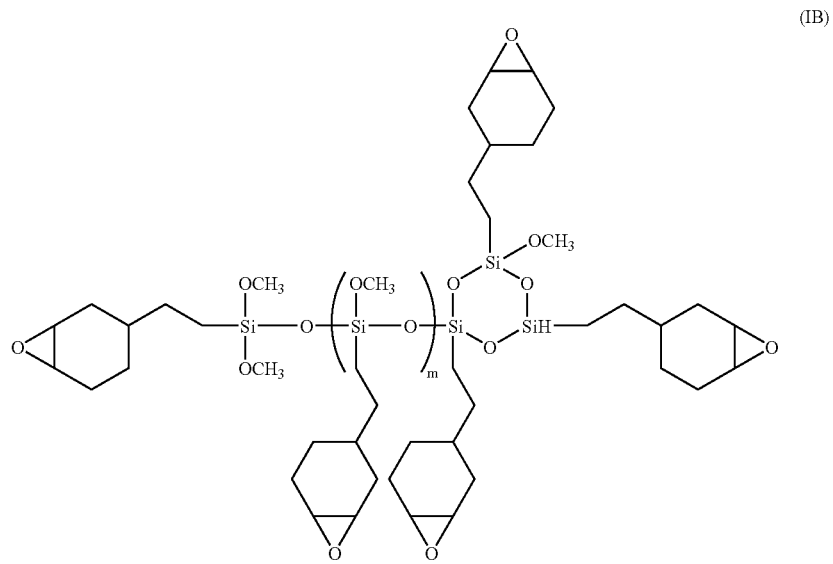

(IB)

wherein m is an integer having a value from 5 to 50;

(C) from about 20 to about 55 parts by weight of at least one non-silicon-containing epoxy resin selected from the group consisting of (i) epoxidized vegetable oils, (ii) epoxidized vegetable oil esters, and (iii) 3,4-epoxycyclohexylmethyl-3',4'-epoxycyclohexane carboxylate having structure (IIA)

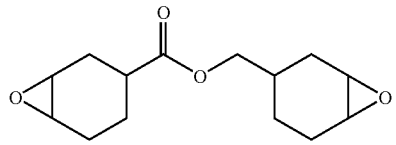

(IIA)

and (D) from 0 to about 60 parts by weight of one or more flexibilizers;

wherein said cationic polymerization initiator is selected from the group consisting of (i) at least one sulfonium salt catalyst in solution with a first carrier medium; (ii) a diaryliodonium salt catalyst in solution with a second carrier medium; and (iii) mixtures of (i) and (ii).

13. The filled coating composition of claim 12, wherein said cationic polymerization initiator is a mixture of triarylsulfonium salt catalysts having structures (V) and (VI) in solution with said first carrier medium:

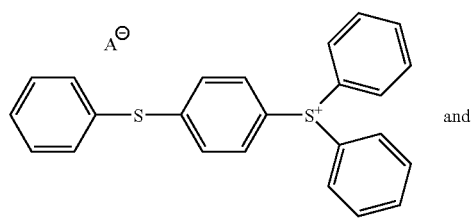

(V)

and

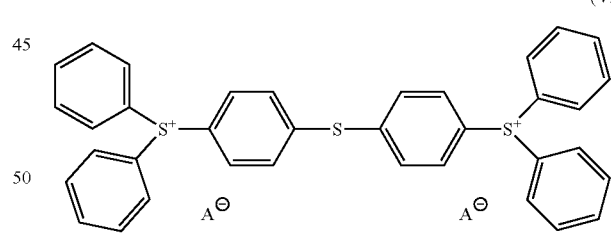

(VI)

wherein $A^-$ is a non-nucleophilic anion selected from the group consisting of $[BF_4]^-$, $[PF_6]^-$, $[AsF_6]^-$, $[SbF_6]^-$, $[B(C_6F_5)_4]^-$, and $[Ga(C_6F_5)_4]^-$.

14. The filled coating composition of claim 13, wherein said first carrier medium is selected from the group consisting of 3,4-epoxycyclohexylmethyl-3',4'-epoxycyclohexane carboxylate, bis(3,4-epoxycyclohexyl) adipate, and propylene carbonate.

15. The filled coating composition of claim 12, wherein said cationic polymerization initiator is a sulfonium salt catalyst having structure (VII) or (IV) in solution with said first carrier medium:

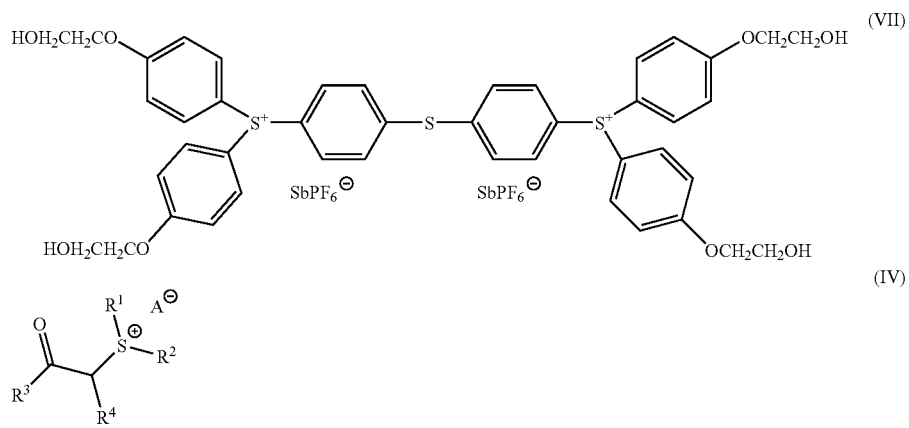

(VII)

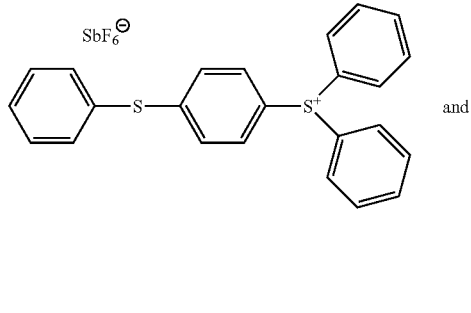

(IV)

wherein R¹ is a $C_1$ to $C_{30}$ monovalent organic radical; R² is a $C_1$ to $C_{30}$ monovalent organic radical, or R¹ and R² taken together may form a 5 or 6-membered ring; R³ is $C_6$ to $C_{20}$ alkyl, aryl, $C_6$ to $C_{20}$ substituted alkyl or substituted aryl; R⁴ is hydrogen or $C_1$ to $C_8$ alkyl; A⁻ is a non-nucleophilic anion selected from the group consisting of $[BF_4]^-$, $[PF_6]^-$, $[AsF_6]^-$, $[SbF_6]^-$, $[B(C_6F_5)_4]^-$, and $[Ga(C_6F_5)_4]^-$.

16. The filled coating composition of claim 12, wherein said cationic polymerization initiator is a catalyst solution comprising about 50 wt. % of a mixture of triarylsulfonium salt catalysts selected from the group consisting of
(i) S,S-diphenyl-4-thiophenoxyphenylsulfonium hexafluoroantimonate having structure (VA) and bis(diphenylsulfonio)-4,4'-diphenylsulfide bishexafluoroantimonate having structure (VIA):

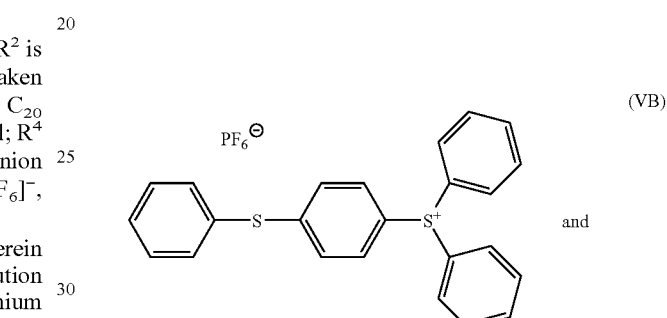

(VA)

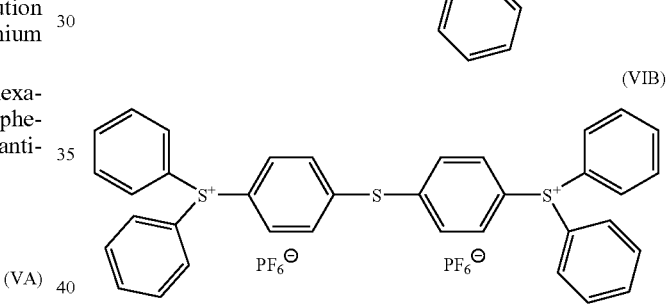

(VIA)

and
(ii) S,S-diphenyl-4-thiophenoxyphenylsulfonium hexafluorophosphate having structure (VB) and bis(diphenylsulfonio)-4,4'-diphenylsulfide bishexafluorophosphate having structure (VIB):

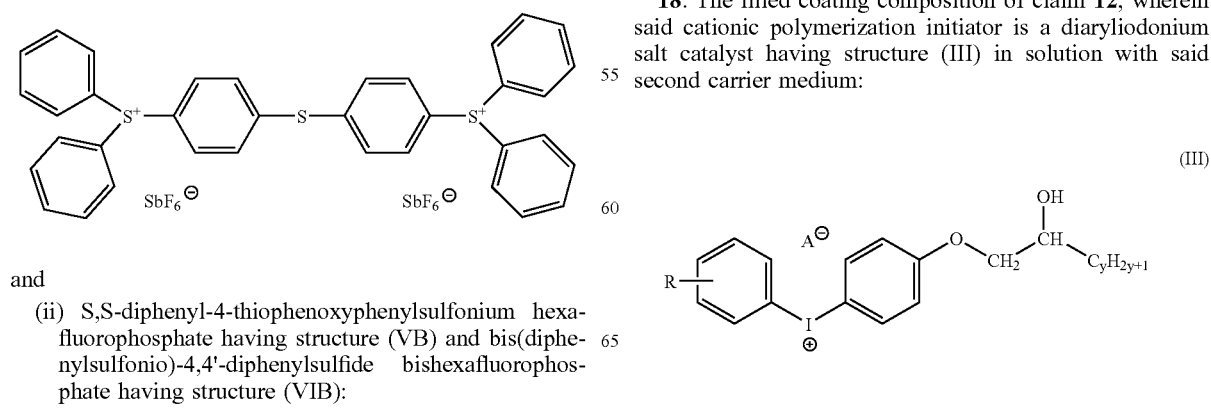

(VB)

(VIB)

and about 50 wt. % of said first carrier medium selected from the group consisting of 3,4-epoxycyclohexylmethyl-3',4'-epoxycyclohexane carboxylate, bis(3,4-epoxycyclohexyl) adipate, and propylene carbonate.

17. The filled coating composition of claim 16, wherein said mixture of triarylsulfonium salt catalysts is a mixture of S,S-diphenyl-4-thiophenoxyphenylsulfonium hexafluoroantimonate having structure (VA) and bis(diphenylsulfonio)-4,4'-diphenylsulfide bishexafluoroantimonate having structure (VIA), and said carrier medium is propylene carbonate.

18. The filled coating composition of claim 12, wherein said cationic polymerization initiator is a diaryliodonium salt catalyst having structure (III) in solution with said second carrier medium:

(III)

wherein R is methyl or hydrogen; y is 0 or an integer from 1 to 25; and A⁻ is a non-nucleophilic anion selected from the group consisting of $[BF_4]^-$, $[PF_6]^-$, $[AsF_6]^-$, $[SbF_6]^-$, $[B(C_6F_5)_4]^-$, and $[Ga(C_6F_5)_4]^-$.

19. The filled coating composition of claim 18, wherein said diaryliodonium salt catalyst is selected from the group consisting of [4-(2-hydroxy-1-tetradecyloxy)-phenyl] phenyliodonium hexafluorophosphate having structure (IIIA), [4-(2-hydroxy-1-tetradecyloxy)-phenyl] 4-methylphenyliodonium hexafluorophosphate having structure (IIIB), [4-(2-hydroxy-1-tetradecyloxy)-phenyl]phenyliodonium hexafluoroantimonate having structure (IIIC), and [4-(2-hydroxy-1-tetradecyloxy)-phenyl] 4-methylphenyliodonium hexafluoroantimonate having structure (IIID):

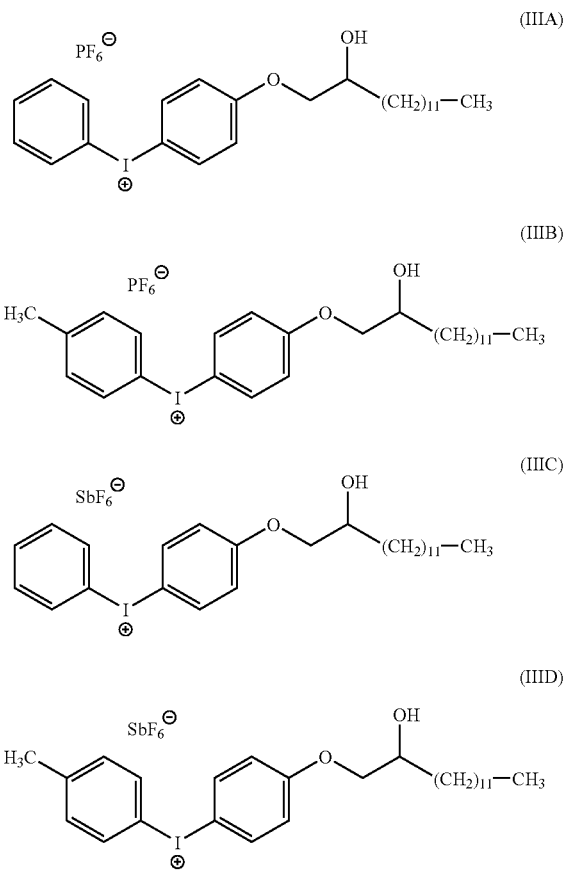

and wherein said second carrier medium is selected from the group consisting of 3,4-epoxycyclohexylmethyl-3',4'-epoxycyclohexane carboxylate, bis(3,4-epoxycyclohexyl) adipate, and propylene carbonate.

20. The filled coating composition of claim 12, wherein said cationic polymerization initiator comprises equal parts by weight of:
(i) a first catalyst solution comprising about 50 wt. % of a mixture of S,S-diphenyl-4-thiophenoxyphenylsulfonium hexafluoroantimonate having structure (VA) and bis(diphenylsulfonio)-4,4'-diphenylsulfide bishexafluoroantimonate having structure (VIA):

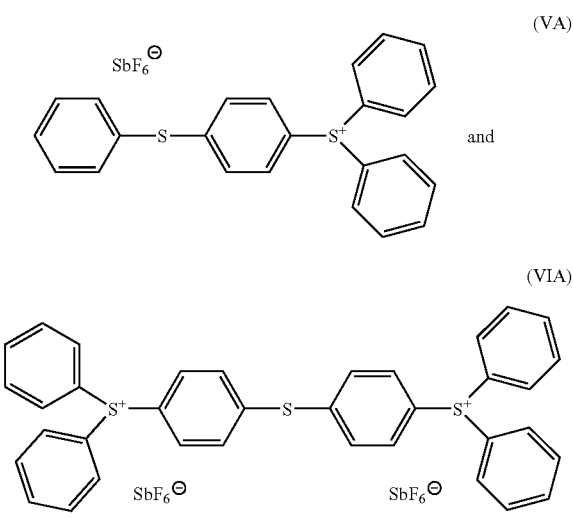

and about 50 wt. % propylene carbonate; and
(B) a second catalyst solution comprising about 40 wt. % [4-(2-hydroxy-1-tetradecyloxy)-phenyl]phenyliodonium hexafluoroantimonate having structure (IIIC)

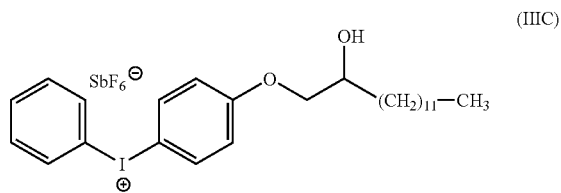

about 60 wt. % 3,4-epoxycyclohexylmethyl-3',4'-epoxycyclohexane carboxylate.

21. The filled coating composition of claim 12, wherein said adhesion promoter is 3-glycidyloxypropyltrimethoxysilane or 2-(3,4-epoxycyclohexyl)-ethyl trimethoxysilane.

22. The filled coating composition of claim 12, wherein said one or more flexibilizers is selected from the group consisting of (i) epoxides based on a diglycidyl ether of bisphenol A having structure (IIB)

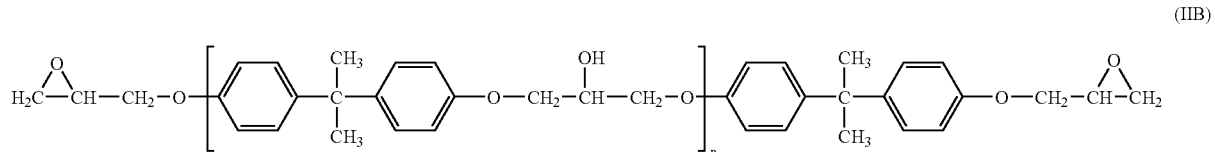

wherein the average value of n is 0 or about 0.07, 0.14, 2.3 or 4.8; (ii) epoxidized alpha olefins; (iii) limonene oxides; (iv) thermoplastic acrylic resins; (v) elastomers; (vi) phenoxy resins; (vii) polyol flexibilizers; (viii) allyl ethers; (ix) hydroxyl-terminated epoxidized polybutadienes; (x) carboxyl-terminated polybutadiene; (xi) carboxyl-terminated polybutadiene acrylonitrile; (xii) phenolic antioxidants; (xiii) oxetane monomers; and (xiv) vinyl ethers.

23. A method for manufacturing a coated article comprising:
   (A) applying said composition of claim 1 to an article comprising wood, glass, plastic, or metal; and
   (B) exposing said article and applied composition to E-beam radiation or to U.V. radiation.

24. The method of claim 23 additionally comprising after step (B) the step of:
   (C) heating said exposed article and applied composition to a temperature ranging from about 80° C. to about 125° C.

25. A method for manufacturing a coated article comprising:
   (A) applying said composition of claim 12 to an article comprising wood, glass, plastic, or metal; and
   (B) exposing said article and applied composition to E-beam radiation or to U.V. radiation.

26. The method of claim 25 additionally comprising after step (B) the step of:
   (C) heating said exposed article and applied composition to a temperature ranging from about 80° C. to about 125° C.

27. A coated article manufactured by said method of claim 23.

28. A coated article manufactured by said method of claim 25.

* * * * *